US009225630B2

(12) United States Patent
Gouache et al.

(10) Patent No.: US 9,225,630 B2
(45) Date of Patent: Dec. 29, 2015

(54) METHOD AND MULTI-HOMED EQUIPMENT FOR ESTABLISHING A MULTIPATH CONNECTION

(71) Applicant: THOMSON LICENSING, Issy de Moulineaux (FR)

(72) Inventors: Stephane Gouache, Cesson Sevigne (FR); Luis Montalvo, Domloup (FR); Charline Taibi, Chartres de Bretagne (FR)

(73) Assignee: Thomson Licensing, Issy les Moulineaux (FR)

( * ) Notice: Subject to any disclaimer, the term of this patent is extended or adjusted under 35 U.S.C. 154(b) by 114 days.

(21) Appl. No.: 14/093,459

(22) Filed: Nov. 30, 2013

(65) Prior Publication Data

US 2014/0153583 A1  Jun. 5, 2014

(30) Foreign Application Priority Data

Nov. 30, 2012 (EP) .................................. 12306499

(51) Int. Cl.
*H04L 12/707* (2013.01)
*H04L 29/06* (2006.01)
*H04L 29/08* (2006.01)
*H04L 12/64* (2006.01)

(52) U.S. Cl.
CPC ............ *H04L 45/24* (2013.01); *H04L 12/6418* (2013.01); *H04L 67/141* (2013.01); *H04L 69/14* (2013.01); *H04L 69/163* (2013.01)

(58) Field of Classification Search
None
See application file for complete search history.

(56) References Cited

U.S. PATENT DOCUMENTS

| | | | |
|---|---|---|---|
| 4,952,930 A | 8/1990 | Franaszek et al. | |
| 7,443,801 B2 | 10/2008 | Neidhardt et al. | |
| 2005/0030900 A1 | 2/2005 | Schwarzbauer et al. | |
| 2007/0005787 A1 | 1/2007 | Igarashi et al. | |
| 2007/0195713 A1* | 8/2007 | Khan | H04L 45/02 370/254 |
| 2010/0061478 A1 | 3/2010 | Liu et al. | |
| 2010/0239039 A1* | 9/2010 | Takai | H04B 7/2662 375/267 |
| 2012/0144062 A1* | 6/2012 | Livet et al. | 709/239 |
| 2012/0320752 A1* | 12/2012 | Gouache et al. | 370/237 |
| 2013/0195004 A1* | 8/2013 | Hampel | 370/315 |
| 2013/0223440 A1* | 8/2013 | DeCusatis et al. | 370/388 |
| 2014/0153583 A1* | 6/2014 | Gouache et al. | 370/437 |

FOREIGN PATENT DOCUMENTS

| | | |
|---|---|---|
| CN | 1622494 | 6/2005 |
| CN | 101841463 | 9/2010 |
| WO | WO 2011101425 A1 * | 8/2011 |

OTHER PUBLICATIONS

Barre, S., Implementation and Assessment of modern host-based multipath solutions, Thesis submitted in partial fulfillment of the requirements for the Degree of Doctor in Engineering Sciences, Oct. 22, 2011, ICTEAM Louvain School of Engineering, Université catholique de Louvain, Louvain-la-Neuve, Belgium.
Sevens, W., TCP/IP Illustrated, vol. 1, The Protocols, Chapter 18—TCP Connection Establishment and Termination, pp. 229-234, Addison-Wesley Co., Jan. 1, 1994.
Tai et al Improvement of SCTP Performance during handshake process, Advanced information networking and applications, Workshops, 2008, AINAW 2008, 22nd international conference on, IEEE, Piscataway, NJ, USA, Mar. 25, 2008, pp. 445-450.
Adhari H et al Evaluation of concurrent multipath transfer over dissimilar paths, Advanced Information Networkingand Applications (WAINA), 2011 IEEE Workshops of international conference on, IEEE, Mar. 22, 2011, pp. 708-714.
Search Report Dated Feb. 11, 2013.
Ford, et al; TCP Extensions for Multipath Operation with Multiple Addresses; Internet Engineering Task Force; May 25, 2012.

* cited by examiner

*Primary Examiner* — Benjamin H Elliott, IV
(74) *Attorney, Agent, or Firm* — Robert D. Shedd; Jerome G. Schaefer

(57) ABSTRACT

According to the invention, the method for establishing a multipath connection across multiple communication paths between a first and a second multi-homed equipments within a least one communication network, both equipments being able to support a multipath protocol, wherein said method comprises the successive steps of:
sending, from the first equipment, main connection establishment requests across at least two communication paths between said first and second equipments;
receiving, from the second equipment, at least one acknowledgement message across one of said communication paths; and
determining, at the first equipment, as a main communication path, the communication path whereby the first one of said at least one acknowledgement message from the second equipment has been received by the first equipment, in order to establish the main connection of said multipath connection across said main communication path.

11 Claims, 6 Drawing Sheets

METHOD AND MULTI-HOMED EQUIPMENT FOR ESTABLISHING A MULTIPATH CONNECTION

This application claims the benefit, under 35 U.S.C. §119 of European Patent Application No. 12306499.0, filed Nov. 30, 2012.

TECHNICAL FIELD OF THE INVENTION

The present invention is related to the transmission of data packets between a first and a second multi-homed equipments through one or more communication networks.

BACKGROUND OF THE INVENTION

In particular, the present invention concerns—but not exclusively—the establishment of a multipath connection operating under the MultiPath Transmission Control Protocol (MPTCP) over the Internet Protocol (IP) between a first multi-homed equipment and a second remote multi-homed equipment. The MPTCP protocol is defined in the draft "TCP Extensions for Multipath Operation with Multiple Addresses" (A. Ford et. al.) published on May 25, 2012 by the Internet Engineering Task Force.

In the framework of the present invention, it should be understood by:

"multi-homed equipment", an equipment comprising at least two interfaces of communication (wired and/or wireless)—each interface having its own communication address (as for example an IP address)—in order to be able to exchange data packets with a remote communication equipment (possibly of a different type) in multipath mode. Consequently, the multi-homed equipment may involve a fixed or mobile telephone (possibly of a "smartphone" type), a fixed or portable computer, a Personal Digital Assistant (PDA), a content receiver (such as a decoder, a residential gateway or a Set-Top Box (STB)), or an item of network equipment such as content server;

"communication path", a path connecting two communication equipments (possibly multi-homed) thanks to two communication interfaces (one per equipment), so that a communication path shall be identified by the pair of communication addresses of the two corresponding communication interfaces; and "sub-flow", a flow of TCP packets operating over a single path, which forms part of a larger MPTCP connection. Such a sub-flow is started and terminated similarly to a regular TCP connection.

Moreover, the MPTCP protocol is an extension of the regular TCP protocol to provide a Multipath TCP service and, especially, to support the concurrent use of multiple IP addresses of a multi-homed equipment. The MPTCP protocol enables a transport connection to operate across multiple paths simultaneously in a compatible manner with multi-homed equipments, initially designed to support a single path TCP connection.

A MPTCP connection between a first and a second multi-homed equipments is usually composed of a main regular TCP connection associated with a main communication path and one or more auxiliary TCP connections—linked to the main regular TCP connection—which are associated with auxiliary communication paths. Such a MPTCP connection continues to appear as a single TCP connection to the applications at both ends.

Moreover, as already known, a multi-homed equipment—able to support the implementation of the MPTCP protocol (also named MPTCP capable)—has usually one fixed interface of communication assigned as the main interface to be used to initiate a MPTCP connection. In order to be efficient, this main interface should be connected to the fastest or the most reliable communication path of the available paths leading to a second remote multi-homed equipment.

However, if the main path between the first equipment and the second equipment happens to be temporarily broken or unusually slow when the MPTCP connection is initiated, the delay for establishing such a MPTCP connection will be long, with the drawbacks of delaying the MPTCP connection establishment or leading, in the worst case, to a failure of the latter. In addition, it could also delay the establishment of auxiliary connections, since the MPTCP protocol requirements specify that the main TCP connection shall be in an established state before initiating auxiliary connections.

SUMMARY OF INVENTION

The present invention proposes a solution to overcome at least some of the above mentioned disadvantages.

To this end, the invention is related to a method for establishing a multipath connection across multiple communication paths between a first and a second equipments (e.g. multi-homed) within at least one communication network, both equipments being able to support a multipath protocol.

According to the present invention, said method is noteworthy in that it comprises the successive steps of:

sending, from the first equipment, main connection establishment requests across at least two communication paths between said first and second equipments;

receiving, from the second equipment, at least one acknowledgement message across one of said communication paths; and determining, at the first equipment, as a main communication path, the communication path whereby the first one of said at least one acknowledgement message from the second equipment has been received by the first equipment, in order to establish the main connection of said multipath connection across said main communication path.

Thus, thanks to the present invention, the first multi-homed equipment is able to discover—preferably automatically—the fastest available path at the time of the multipath connection establishment to consider it as the main path for the multipath connection. The time required to establish a multipath connection can then be reduced.

In a preferred embodiment, the method further comprises the steps of:

sending, from the first equipment, an acknowledgement message together with a first data message across said determined main communication path; and receiving, from the second equipment, an establishment acknowledgement message to establish the main connection of said multipath connection between the first and second equipments.

In a first aspect, said method can further comprise the step of sending, from the first equipment, a reset request across each of auxiliary communication paths, which differ from the determined main communication path, for aborting the connection along those auxiliary communication paths.

In a second aspect, said method can further comprise the steps of:

sending, from the first equipment, an auxiliary connection establishment request across at least one of the auxiliary communication paths;

receiving, from the second equipment, at least one acknowledgement message across said auxiliary communication path; and sending, from the first equipment, an acknowledgement message across said auxiliary communication path, so that an auxiliary connection of said multipath connection is established between the first equipment and the second equipment across said auxiliary communication path.

In a third aspect, said method can further comprise the steps of:

sending, from the first equipment, an information message representative of the first equipment possible auxiliary communication paths, across said main communication path;

receiving, from the second equipment, an auxiliary connection establishment request across at least one of the auxiliary communication paths;

receiving, from the first equipment, at least one acknowledgement message across said auxiliary communication path; and sending, from the second equipment, an acknowledgement message across said auxiliary communication path, so that an auxiliary connection of said multipath connection is established between the first equipment and the second equipment across said auxiliary communication path.

Advantageously, said main connection establishment requests can be sent essentially simultaneously by the first equipment.

Preferably, the multipath protocol is the MultiPath Transmission Control Protocol over the Internet Protocol.

In another aspect, said method can comprise the step of listing the communication paths between the first equipment and the second equipment, according to at least one performance criteria.

The present invention is also directed to a first equipment (e.g. multi-homed) adapted for establishing a multipath connection across multiple communication paths between said first multi-homed equipment and a second multi-homed equipment within at least a communication network, both equipments being able to support a multipath protocol.

According to the present invention, said equipment comprises:

a sender configured for sending to the second equipment, main connection establishment requests across at least two communication paths between said equipments;

a receiver configured for receiving from the second equipment, at least one acknowledgement message across one of said known communication paths;

an estimator configured for determining as a main communication path, the communication path whereby the first one of said at least one acknowledgement message from the second equipment has been received by said first equipment, in order to establish the main connection of said multipath connection across said main communication path.

In addition, the sender can be further configured for sending to the second equipment a reset request across each of auxiliary communication paths, which differ from the determined main communication path, for aborting the connection along those communication paths.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF DRAWINGS

The invention will be better understood and illustrated by means of the following embodiment and execution examples, in no way restrictive, with reference to the appended figures among which.

Wherever possible, the same reference numerals will be used throughout the figures to refer to the same or like parts.

DETAILED DESCRIPTION OF PREFERRED EMBODIMENTS

According to a preferred embodiment, the present invention is depicted with regard to the multipath protocol MPTCP over the Internet Protocol. Naturally, the invention is not restricted to such a particular embodiment and other multipath protocols could of course be considered and implemented.

In the preferred embodiment, two multi-homed and multi-addressed Equipments—respectively a client C and a server S—communicating with each other through a communication network N (represented on FIG. 1) are considered.

Each equipment C or S is MPTCP capable and comprises several interfaces of connection identified by their IP address. In the particular example of FIGS. 1 to 4, the client C and the server S have two interfaces respectively referenced by A1, A2 and B1, B2: there are therefore up to four different paths between the client C and the server S, namely A1-B1, A1-B2, A2-B1 and A2-B2. Obviously, in a variant, the number of interfaces might be different.

Figure 1:
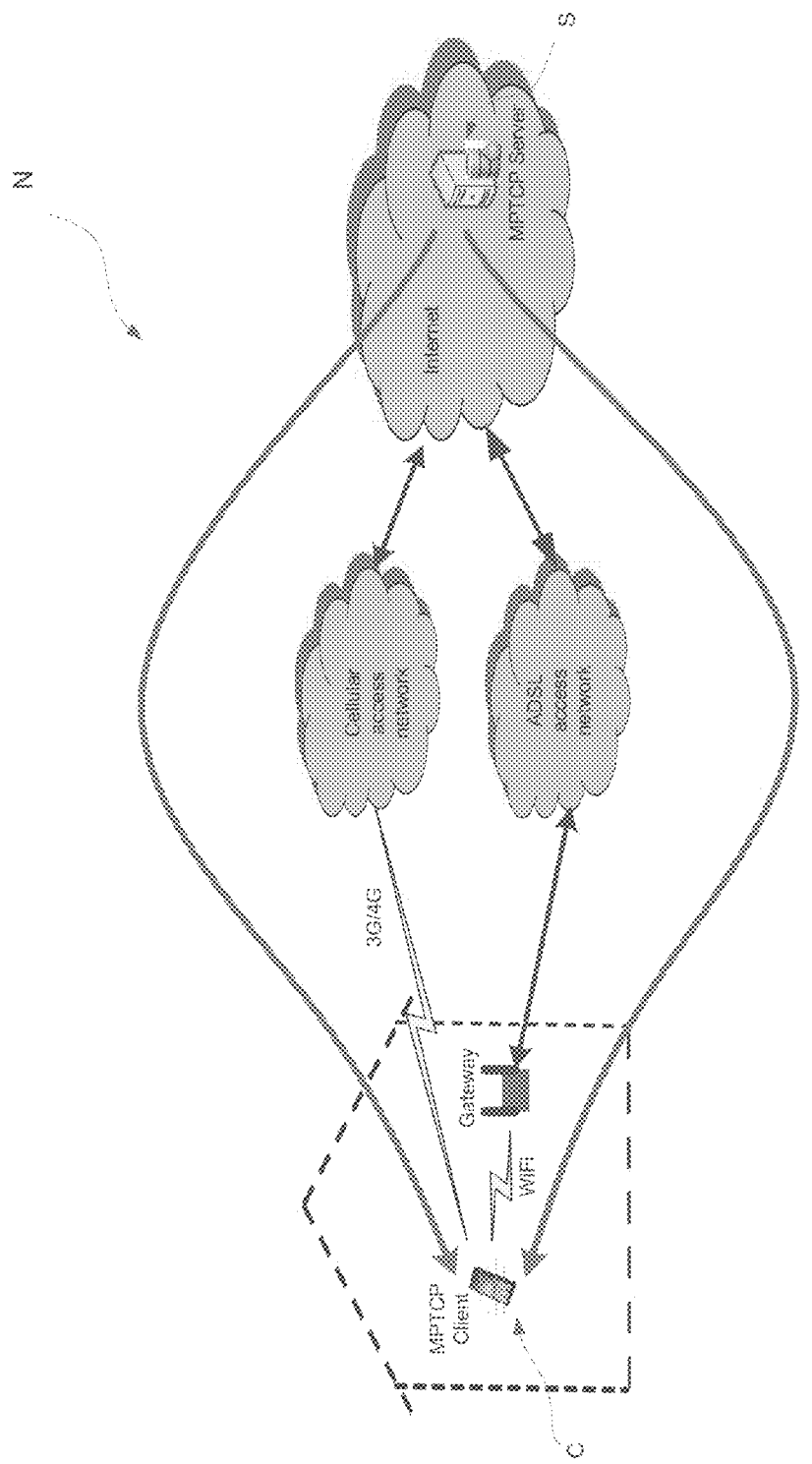
FIG. 1 is a schematic diagram of an example of a communication network wherein the present invention might be implemented.

In the example of FIG. 1, the client C can reach the remote server S through Internet via a cellular access network and an ASDL access network. The cellular access network (for instance 3G and/or 4G) is directly accessible by the client C, whereas the ADSL access network is accessible by the client C through a gateway. The client C can communicate with such a gateway via wireless and/or wired interfaces (as for example WiFi, Ehtemet, etc.).

Figure 2:
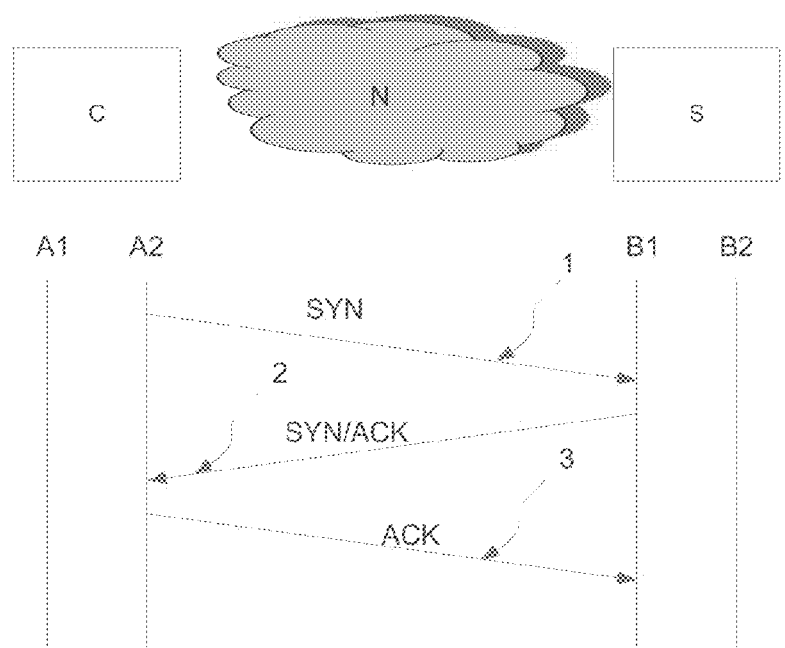
FIG. 2 schematically represents the usual steps implemented for establishing a regular TCP connection between a client equipment and a server within the communication network of FIG. 1.

As shown in FIG. 2, the establishment of a single path TCP connection between the client C and the server S is usually defined by a three state connection protocol (often called the three-way hand-shake):

in a first state, the client C sends (arrow 1 on FIG. 2) a synchronization packet (SYN) (corresponding to a connection establishment request) to the server S specifying the port number of the server S that the client C wants to connect to and the client's initial sequence number (ISN). The client C is then in an embryonic state (SYN_SENT) and waits for a response from the server S. Two interfaces of communication A1, A2 and B1, B2 are represented for each equipment S, C;

in second state, the server S replies (arrow 2) with a first type acknowledgment packet (SYN/ACK) containing the server's initial sequence number (ISN) and an acknowledgment packet (ACK) for the client's SYN packet (comprising the client's ISN plus one, the SYN packet consuming one sequence number). In this second state, the server S is also in an embryonic state (SYN_RCVD); and in a third state, the client C must send (arrow 3) a second type acknowledgment packet (ACK) with the server's ISN plus one, to acknowledge the reception of the SYN packet from the server S. In this third state, the client C enters into an established connection state and, upon receipt of the ACK packet form the client C, the server S also enters into an established connection state. A TCP connection (A2-B1 on the FIG. 2) is then fully opened.

Figure 3A:
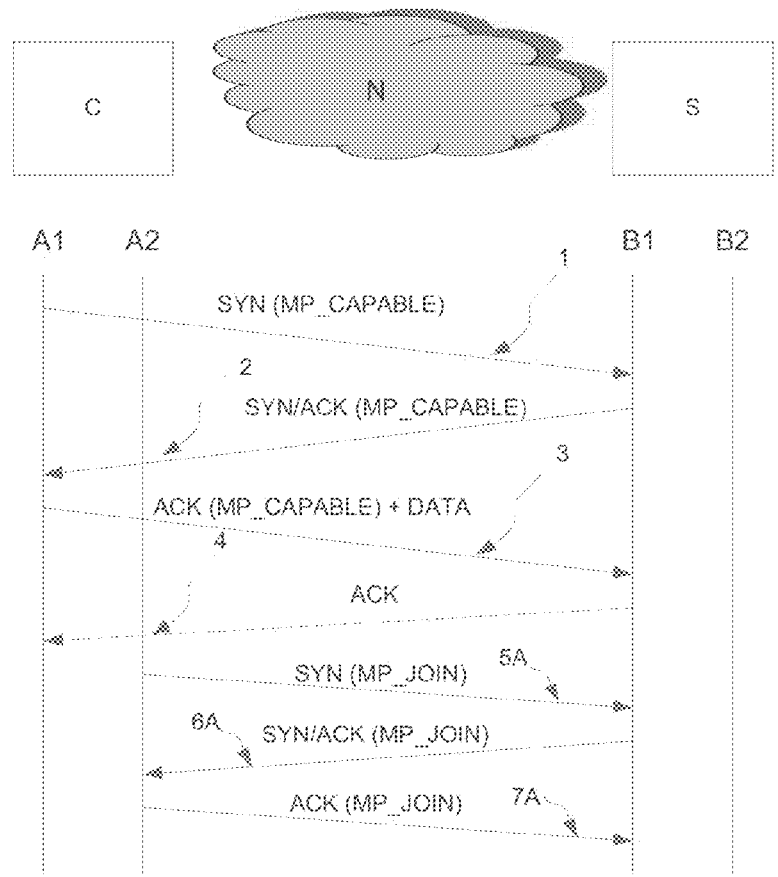
FIGS. 3A and 3B is a flow chart illustrating the usual steps implemented for initiating a MPTCP connection between a client equipment and a server within a communication network, according to an implicit way (FIG. 3A) and an explicit way (FIG. 3B) respectively.
Figure 3B:
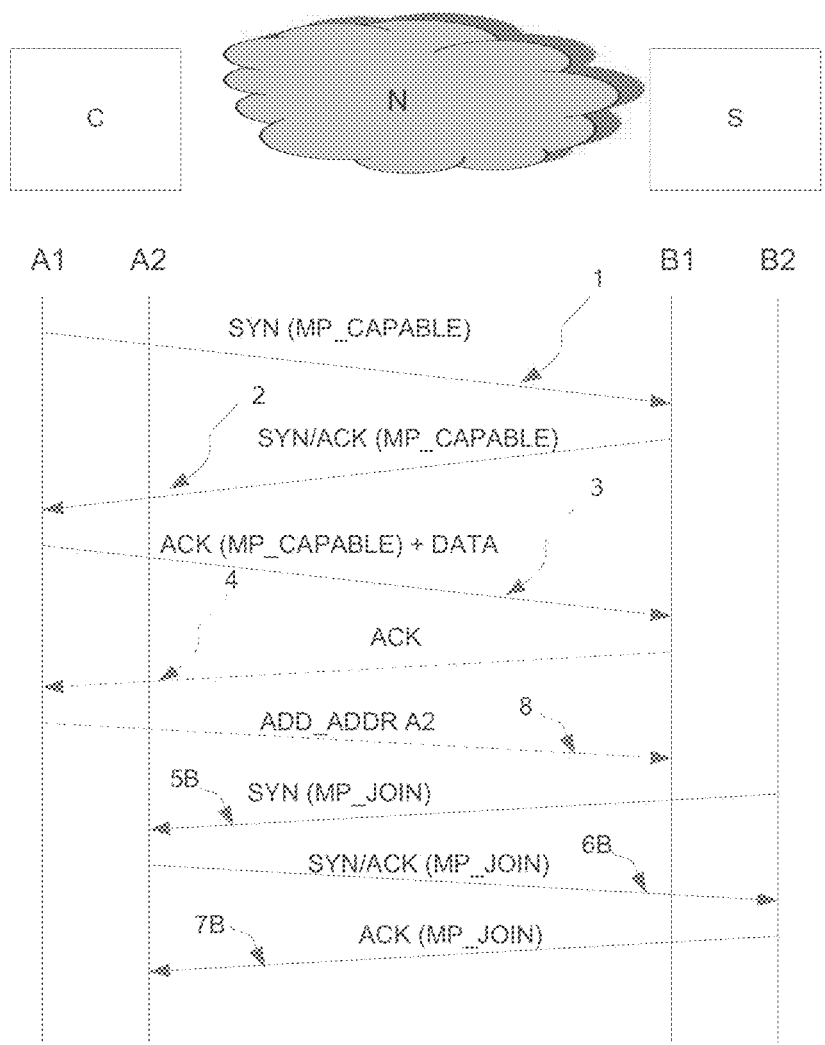

The FIGS. 3A and 3B illustrate the establishment of a MPTCP connection between the multi-homed and MPTCP capable client C and the multi-homed and MPTCP capable server S. As already known, such an establishment is composed of the following three phases:

in a first phase (represented by arrows 1 to 3 on FIGS. 3A and 3B), the client C initiates a regular TCP connection, but the sent SYN, SYN/ACK and ACK+DATA packets further carry a multipath capable option (MP_CAPABLE). This option allows the client C and the server S to exchange some information used to authenticate the establishment of auxiliary TCP connections (or subflows) and to check whether the remote server S supports the MPTCP protocol;

in a second phase (arrow 4), the MPTCP capable server S must reply to the second type ACK+DATA packet from the client C with an establishment ACK packet, which may contain data or not if it does not have data to send immediately. If the client C does not receive such an establishment ACK packet within the retransmission timeout (RTO), it shall resend the establishment ACK packet containing the MP_CAPABLE option. The MPTCP connection on the client side is in a pre-established state (PRE_ESTABLISHED), while awaiting this establishment ACK packet. Preferably upon receipt of the establishment ACK packet from the server S, the client C will change to an established state (ESTABLISHED); and in a third phase (respectively represented by arrows 5A, 6A, 7A in FIG. 3A and by arrows 5B, 6B, 7B, 8 in FIG. 3B), a new TCP connection or several new TCP connections are created and linked to the main TCP connection established at the end of the first phase. There are basically two main procedures to establish these auxiliary TCP connections:

one implicit procedure (FIG. 3A), wherein the client C initiates (arrows 5A, 6A and 7A) a new auxiliary TCP connection from a second IP address A2 to the known server's IP address B1; and one explicit procedure (FIG. 3B), wherein the client C provides (arrow 8) to the server S the IP addresses available (in the example A2) for the MPTCP connection, so that the server S initiates (arrow 5B, 6B and 7B) a new auxiliary TCP connection with one of these available IP addresses.

In both cases (implicit and explicit), the SYN, SYN/ACK and ACK packets (represented respectively by arrows 5A, 6A and 7A in FIG. 3A and arrows 5B, 6B and 7B in FIG. 3B) further carry a join option (MP_JOIN).

Figure 4A:
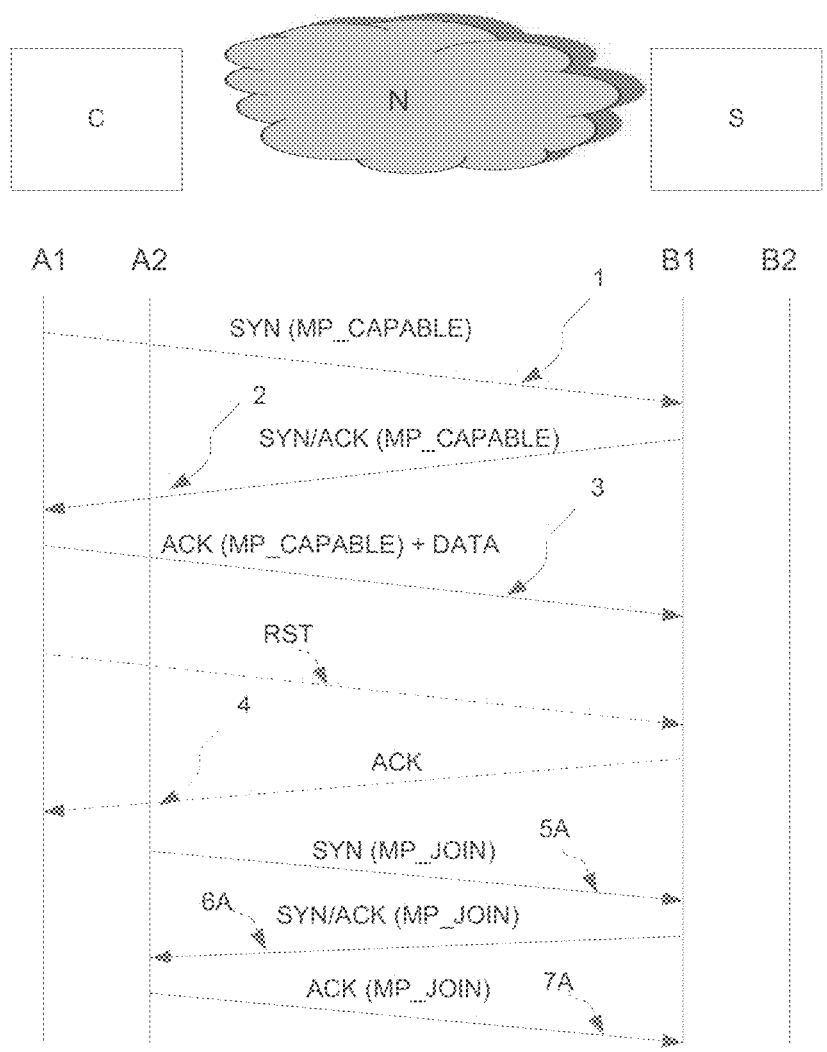
FIG. 4A illustrates the steps of a preferred embodiment of the method for establishing a multipath connection, according to the present invention.
Figure 4B:
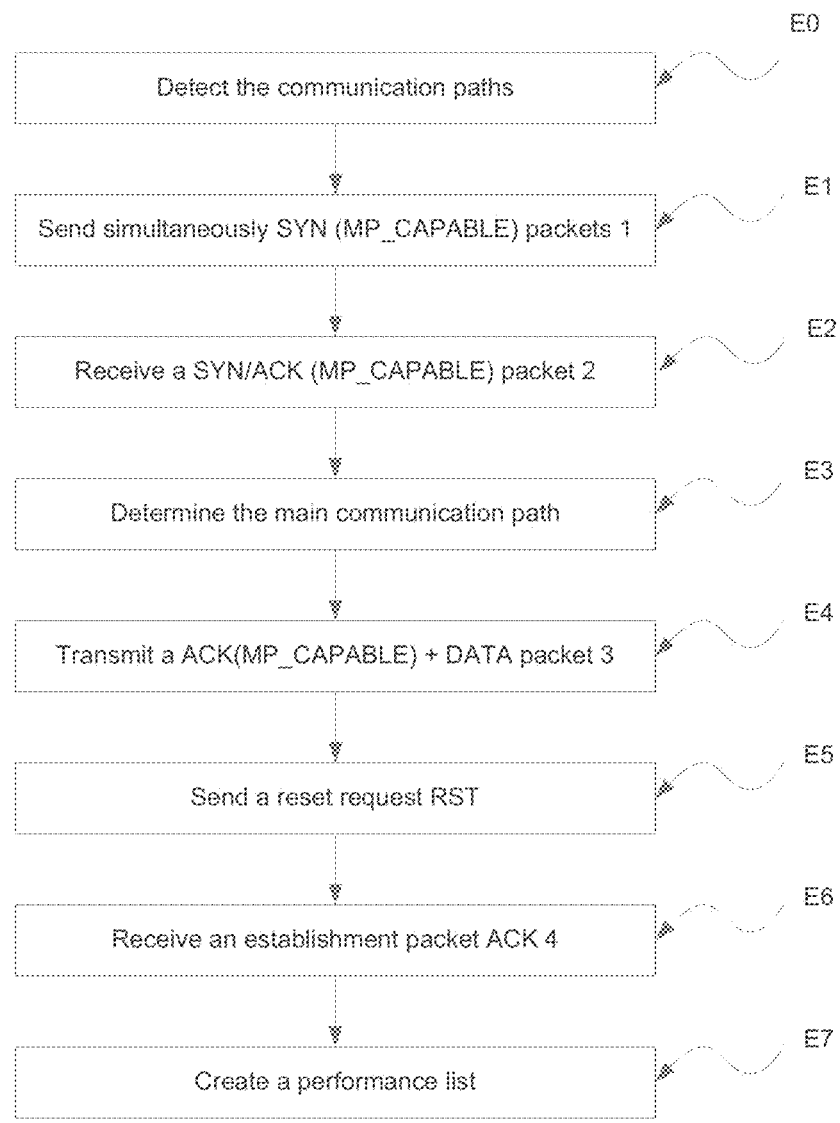
FIG. 4B is a flow chart of the method according to said preferred embodiment.

Besides, the flow chart depicted in FIG. 4B describes the various steps of the method for establishing a MPTCP connection between the client C and the server S, according to the preferred embodiment of the present invention.

In particular, in a preliminary step E0, the client C can obtain the various communication paths existing between it and the server S. In an alternative, one can imagine that the client C might already know the communication paths.

In a first step E1, the client C sends essentially simultaneously synchronization packets SYN 1 (corresponding to connection establishment requests) carrying the MP_CAPABLE option to the server S through all the known communication paths between the client C and the server S. In other words, one SYN packet embedding the MP_CAPABLE option is transmitted from the client C to the server S through each known communication path (A1-B1, A1-B2, A2-B1 and A2-B2 in the example). For the sake of clarity, only one SYN(MP_CAPABLE) packet 1 has been illustrated on the FIG. 4A.

Obviously, as a variant, the SYN packets could be sent through only some of the known communication paths.

In a further step E2, the client C—being in a waiting state—receives at least one first type acknowledgment packet SYN/ACK 2 carrying the MP_CAPABLE option from the server S through one of said known communication paths.

Upon receipt of such a SYN/ACK packet 2, the client C determines, in a further step E3, the path by which the SYN/ACK packet 2 has been first received by the client C, as a main communication path of the multipath connection to establish.

In a further step E4, the client C transmits a second type acknowledgment packet ACK+DATA 3 carrying the MP_CAPABLE option to the server S through said determined main communication path. The client is then in a pre-established state (PRE-ESTABLISHED).

In a further optional step E5, the client C sends to the server S a reset request RST across each of auxiliary communication paths—which have not been determined as the main communication path of the multipath MPTCP communication—for cancelling the connection along those auxiliary paths.

In a further step E6, the client C receives an establishment acknowledgement packet ACK 4—sent by the server S upon reception of the second type ACK (MP_CAPABLE) packet—to establish the main connection of said multipath MPTCP connection. The client C is then in an established state (ESTABLISHED).

In additional steps (only represented in FIG. 4A), auxiliary TCP Connections—linked to the established multipath MPTCP connection—might be set up according to one of the two procedures (implicit or explicit) previously discussed in reference to FIG. 3A (arrows 5A, 6A and 7A) and FIG. 3B (arrows 5B, 6B, 7B and 8). The implicit procedure is only represented in FIG. 4A.

In addition, a performance list of the known communication paths between the client C and the server S might be created, in a further step E7, wherein the known communication paths are ranked according to one or several criteria, for instance the reliability and/or the speed of each path. The performance list could be updated periodically by measuring the Round-Trip Time (RTT) and the Packet Error Rate (PER) of each communication path (main and auxiliary paths).

Thanks to such a performance list, the client C is able to send or request data on a preferred communication path in order to optimize data exchange with the server S.

Figure 5:
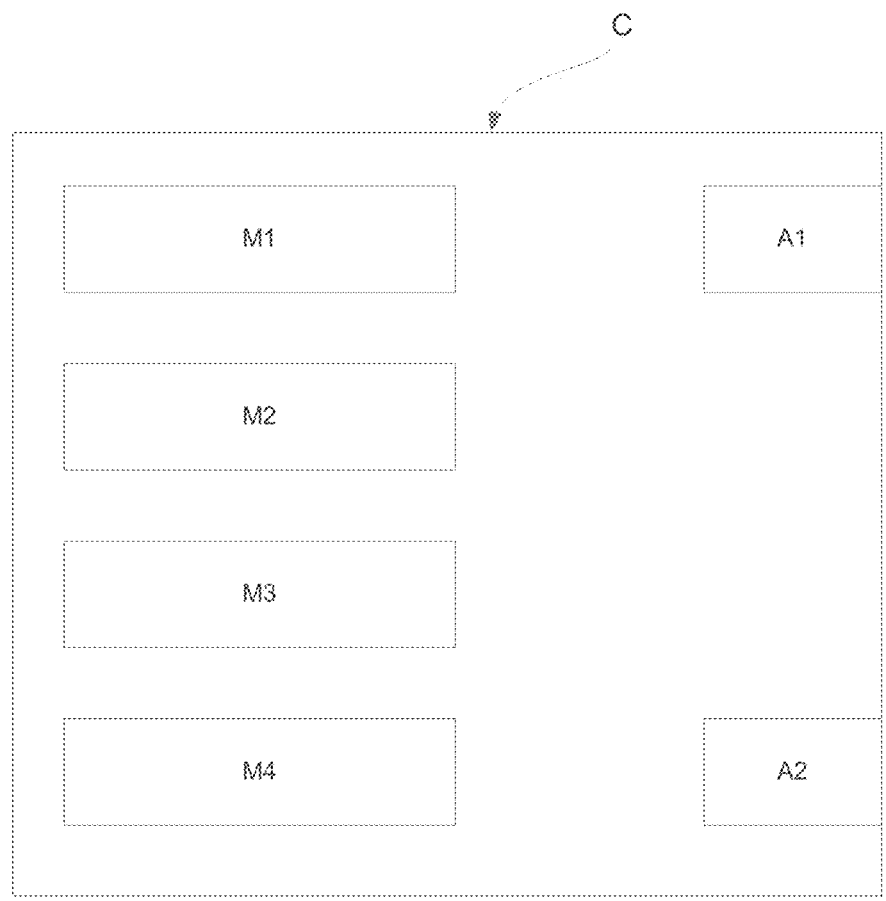
FIG. 5 is a block diagram of a device compliant with the present invention, which is able to implement the method as described in FIG. 4.

Moreover, the block diagram shown in FIG. 5 represents a device compliant with the present invention and corresponding to the client C, which is able to implement the method as above described in reference to FIGS. 4A and 4B.

In particular, the client C comprises:
- interfaces of communication A1 and A2 (wired or/and wireless), each interface having its own IP address;
- a module M1, also called sender, configured for sending to the server S at least:
  - main connection establishment requests SYN 1 carrying the MP_CAPABLE option through at least some of the known communication paths, such requests being advantageously sent simultaneously;
  - a second type acknowledgement message ACK+DATA 3 carrying the MP_CAPABLE option across the determined main path;
  - a reset request RST across each of auxiliary communication paths for aborting the connection along those auxiliary communication paths;
  - a connection establishment request SYN 5A carrying the MP_JOIN option through an auxiliary communication path;
  - an acknowledgement message SYN/ACK 6B carrying the MP_JOIN option across an auxiliary communication path;
  - a second type acknowledgement message ACK 7A carrying the MP_JOIN option across an auxiliary path;
  - an information message 8 representative of the possible auxiliary communication paths.
- a module M2, also called receiver, configured for receiving from the server S at least:
  - one first type acknowledgement message SYN/ACK 2 carrying the MP_CAPABLE option across one of said known communication paths;
  - an establishment acknowledgement packet ACK 4 to establish a main connection of said multipath MPTCP connection;
  - a connection establishment request SYN 5B carrying the MP_JOIN option through an auxiliary communication path;
  - a first type acknowledgement message SYN/ACK 6A carrying the MP_JOIN option across an auxiliary communication path;
  - a second type acknowledgement message ACK 7B carrying the MP_JOIN option across an auxiliary path;
- a module M3, also called estimator, configured for determining as a main communication path, the path by which a first type acknowledgement message SYN/ACK from the server S has been first received by the client C; and
- a module M4, also called calculator, configured for establishing the performance list.

The represented blocks M1 to M4 on FIG. 5 are purely functional units, which do not necessarily correspond to physical separated units. Namely, they could be developed in the form of software, or be implemented in one or several integrated circuits comprising one or more processors.

The flowchart and/or block diagrams in the FIGS. 1 to 5 illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems (e.g. comprising one or more processors) that perform the specified functions or acts, or combinations of special purpose hardware and computer instructions.

The invention claimed is:

1. A method for establishing a multipath connection across multiple communication paths between a first and a second equipments within a least one communication network, both equipments being able to support a multipath protocol, the method comprising, at the first equipment:
   sending concurrently, from the first equipment, main connection establishment requests across at least two communication paths between said first and second equipments;
   receiving, from the second equipment, at least one acknowledgement message across one of said communication paths; and
   determining as a main communication path, the communication path whereby the first one of said at least one acknowledgement message from the second equipment has been received by the first equipment, in order to establish the main connection of said multipath connection across said main communication path.

2. A method according to claim 1, further comprising:
   sending, from the first equipment, an acknowledgement with a first data message across said determined main communication path; and
   receiving, from the second equipment, an establishment acknowledgement message to establish the main connection of said multipath connection between the first and second equipments.

3. A method according to claim 2, further comprising sending, from the first equipment, a reset request across each of auxiliary communication paths, which differ from the determined main communication path, for aborting the connection along those auxiliary communication paths.

4. A method according to claim 3, further comprising:
   sending, from the first equipment, an auxiliary connection establishment request across at least one of the auxiliary communication paths;
   receiving, from the second equipment, at least one acknowledgement message across said auxiliary communication path; and
   sending, from the first equipment, an acknowledgement message across said auxiliary communication path, so that an auxiliary connection of said multipath connection is established between the first equipment and the second equipment across said auxiliary communication path.

5. A method according to claim 3, further comprising the steps of:
  sending, from the first equipment, an information message representative of the first equipment possible auxiliary communication paths, across said main communication path;
  receiving, from the second equipment, an auxiliary connection establishment request across at least one of the auxiliary communication paths;
  receiving, from the first equipment, at least one acknowledgement message across said auxiliary communication path; and
  sending, from the second equipment, an acknowledgement message across said auxiliary communication path, so that an auxiliary connection of said multipath connection is established between the first equipment and the second equipment across said auxiliary communication path.

6. A method according to claim 1, wherein the multipath protocol is the MultiPath Transmission Control Protocol over the Internet Protocol.

7. A method according to claim 1, further comprising the step of listing the communication paths between the first equipment and the second equipment, according to at least one performance criteria.

8. A first multi-homed equipment adapted for establishing a multipath connection across multiple communication paths between said first multi-homed equipment and a second multi-homed equipment within at least one communication network, both equipments being able to support a multipath protocol, the first multi-homed equipment comprising:
  a sender configured for concurrently sending to the second equipment, main connection establishment requests across at least two communication paths between said equipments;
  a receiver configured for receiving from the second equipment, at least one acknowledgement message across one of said known communication paths;
  an estimator configured for determining as a main communication path, the communication path whereby the first one of said at least one acknowledgement message from the second equipment has been received by said first equipment, in order to establish the main connection of said multipath connection across said main communication path.

9. The multi-homed equipment according to claim 8, wherein the sender is further configured for sending to the second equipment a reset request across each of auxiliary communication paths, which differ from the determined main communication path, for aborting the connection along those communication paths.

10. The first multi-homed equipment according to claim 8, wherein:
  the sender is further configured for sending an acknowledgement with a first data message across said determined main communication path; and
  the receiver is further configured for receiving, from the second equipment, an establishment acknowledgement message to establish the main connection of said multipath connection between the first and second equipments.

11. The first multi-homed equipment according to claim 8, wherein:
  the sender is further configured for sending an auxiliary connection establishment request across at least one of the auxiliary communication paths;
  the receiver is further configured for receiving, from the second equipment, at least one acknowledgement message across said auxiliary communication path; and
  the sender is further configured for sending an acknowledgement message across said auxiliary communication path, so that an auxiliary connection of said multipath connection is established between the first equipment and the second equipment across said auxiliary communication path.

* * * * *